(12) United States Patent
Bartig

(10) Patent No.: US 8,763,233 B2
(45) Date of Patent: Jul. 1, 2014

(54) PUNCH RIVET, METHOD FOR PRODUCING A PUNCH RIVET CONNECTION, AND WORKPIECE ARRANGEMENT

(75) Inventor: Paul Bartig, Giessen (DE)

(73) Assignee: Newfrey LLC, Newark, DE (US)

( * ) Notice: Subject to any disclaimer, the term of this patent is extended or adjusted under 35 U.S.C. 154(b) by 63 days.

(21) Appl. No.: 13/404,739

(22) Filed: Feb. 24, 2012

(65) Prior Publication Data
US 2012/0180305 A1 Jul. 19, 2012

Related U.S. Application Data

(63) Continuation of application No. PCT/EP2010/062075, filed on Aug. 19, 2010.

(30) Foreign Application Priority Data

Aug. 24, 2009 (DE) .......................... 10 2009 039 936

(51) Int. Cl.
*F16B 19/08* (2006.01)
*B21J 15/02* (2006.01)

(52) U.S. Cl.
USPC ........ 29/525.06; 29/432; 29/432.1; 29/432.2; 29/525.01; 29/525.05; 29/798; 411/501

(58) Field of Classification Search
USPC ................. 29/525.06, 525.01, 525.05, 432.2, 29/432.1, 432, 798, 407.08, 407.05, 29/407.01; 411/501
See application file for complete search history.

(56) References Cited

U.S. PATENT DOCUMENTS

| | | | |
|---|---|---|---|
| 2,887,694 A * | 5/1959 | Sauter | 470/30 |
| 5,140,735 A * | 8/1992 | Ladouceur | 29/243.522 |
| 5,868,535 A * | 2/1999 | Ladouceur | 411/181 |
| 6,385,843 B1 | 5/2002 | Singh et al. | |
| 6,663,329 B2 * | 12/2003 | Singh et al. | 411/501 |
| 6,732,420 B2 * | 5/2004 | Wang et al. | 29/525.06 |
| 6,763,568 B1 * | 7/2004 | Mauermann et al. | 29/432.2 |
| 6,988,862 B1 * | 1/2006 | Iguchi et al. | 411/501 |
| 7,284,319 B2 * | 10/2007 | Kato et al. | 29/798 |
| 7,425,111 B2 * | 9/2008 | Ladouceur | 411/181 |
| 7,628,573 B2 * | 12/2009 | Philipskotter et al. | 411/501 |
| 7,762,753 B2 * | 7/2010 | Jokisch | 411/501 |
| 8,230,571 B2 * | 7/2012 | Kovac | 29/432.1 |
| 2004/0022602 A1 * | 2/2004 | Singh et al. | 411/501 |
| 2004/0096295 A1 * | 5/2004 | Stevenson et al. | 411/501 |
| 2005/0086799 A1 * | 4/2005 | Kato et al. | 29/798 |
| 2005/0111934 A1 * | 5/2005 | Ladouceur | 411/501 |
| 2007/0104553 A1 * | 5/2007 | Philipskotter et al. | 411/176 |
| 2008/0232930 A1 * | 9/2008 | Jokisch | 411/501 |

(Continued)

FOREIGN PATENT DOCUMENTS

| | | | | |
|---|---|---|---|---|
| DE | 20319610 U | | 4/2004 | |
| WO | WO 2007016901 A1 * | | 2/2007 | F16B 19/08 |

*Primary Examiner* — Essama Omgba
*Assistant Examiner* — Darrell C Ford
(74) *Attorney, Agent, or Firm* — Michael P. Leary

(57) ABSTRACT

The invention relates to a punch rivet for connecting two workpieces. The rivet includes a head and a hollow shank having a shank internal diameter (D3), a shank external diameter (D1) and a shank end face. Located at the shank end face is an annular cutting edge with a diameter (D4) that is smaller than the shank external diameter (D1). The shank internal diameter (D3) merges with the annular cutting edge via a cutting edge radius (R2); and the ratio of the cutting edge radius to the shank external diameter R2/D1 is greater than 0.3.

11 Claims, 3 Drawing Sheets

(56) References Cited

U.S. PATENT DOCUMENTS

| | | | |
|---|---|---|---|
| 2009/0116934 A1* | 5/2009 | Trinick | 411/501 |
| 2010/0018027 A1* | 1/2010 | Stevenson et al. | 29/525.06 |
| 2010/0119330 A1* | 5/2010 | Auriol | 411/501 |
| 2010/0232906 A1* | 9/2010 | Singh et al. | 411/501 |
| 2012/0060338 A1* | 3/2012 | Trinick | 29/243.53 |
| 2012/0090158 A1* | 4/2012 | Trinick | 29/525.06 |
| 2012/0180305 A1* | 7/2012 | Bartig | 29/525.06 |
| 2013/0055549 A1* | 3/2013 | Auriol et al. | 29/525.07 |
| 2013/0273314 A1* | 10/2013 | Campbell et al. | 428/138 |

* cited by examiner

PUNCH RIVET, METHOD FOR PRODUCING A PUNCH RIVET CONNECTION, AND WORKPIECE ARRANGEMENT

CROSS-REFERENCE TO RELATED APPLICATIONS

This application is a continuation of PCT Application No. PCT/EP2010/062075, filed Aug. 19, 2010 which claims priority from German Patent Application No. 102009039936.4, filed on Aug. 24, 2009, the disclosure of which is incorporated herein by reference.

BACKGROUND OF THE INVENTION

The present invention relates to a punch rivet for connecting two workpieces, with a head and a shank, the shank being embodied as a hollow shank having a shank internal diameter, a shank external diameter and a shank end face, there being embodied at the shank end face an annular cutting edge, the diameter of which is smaller than the shank external diameter, and the shank internal diameter merging with the annular cutting edge via a cutting edge radius.

A punch rivet of this type is known from document DE 10 2005 052 360 B4.

The invention further relates to a method for producing a punch rivet connection of at least two workpieces, of which one is made, in particular, of a high-strength material having a strength of at least 800 MPa and has, in particular, a thickness of at least 0.5 mm. The present invention further relates to a workpiece arrangement made up of at least two workpieces which are connected by means of at least one punch rivet of this type or by means of a punch riveting method of this type.

Punch riveting is a reshaping joining method and can be carried out by means of what are known as solid rivets and what are known as semitubular rivets. The present case relates to punch riveting with a semitubular rivet which is embodied with a hollow shank. This method is characterized in that the semitubular rivet is driven into an arrangement of two workpieces (in particular two metal sheets), the top workpiece being punched through (pierced) by the hollow shank. A die plate on which the bottom workpiece rests is designed in such a way that the hollow shank is subsequently radially spread and is driven radially into the lower workpiece, thus forming an undercut. In this case, the lower workpiece is generally not severed, so that the side of the lower workpiece that faces the die plate remains closed and accordingly has low susceptibility to rusting. This punch riveting method with a semitubular rivet has for years increasingly been used in the automotive industry. The punch riveting method is suitable, in particular, for connecting workpieces made of different material (for example steel and aluminium). As, in particular in body construction, there is a trend toward a combination of different materials adapted to the respective purpose of application, the punch riveting method is for this case a joining method which is preferable over welding methods.

It will in this case be understood that at least the material of the lower, die plate-side workpiece should be readily cold formable and have material properties which are as homogeneous as possible.

As, in the above-described field of application, there is a trend toward high-strength materials (for example materials of the upper, swage-side workpiece of greater than 1,000 MPa), the punch rivets used for this purpose have to have a correspondingly higher strength (rivet hardness), in particular in order to be able to punch through a workpiece of this type made of a high-strength material. At the same time, the punch rivet should be sufficiently deformable in its shank region to ensure a sufficient undercut in the finished punch rivet connection.

In the field of semitubular rivets there are various types, for example what is known as the C rivet such as is known from document WO 95/09307. The semitubular rivet described therein has a cylindrical hollow shank, a sharp annular cutting edge being formed at the outer edge of the end face of the shank. For this purpose, the internal diameter merges with the shank external diameter via a cutting edge radius. However, this C rivet is less suitable for the punch riveting of high-strength materials, as the C rivet has a tendency to spread intensively during the punch riveting process, so that only little material is present in the undercut region of the lower workpiece. The strength which may be achieved is accordingly relatively low. A modified C rivet with a sharp annular cutting edge, which is however set apart from the shank external diameter, is known from document DE 203 19 610 U1.

Furthermore, what is known as a P rivet is known in the art, for example from document DE 10 2005 052 360 B4.

In this punch rivet there is formed at the shank end face an annular cutting edge, the diameter of which is smaller than the shank external diameter. The annular cutting edge is embodied as a planar annular surface which is oriented in the radial direction, merges with the shank external diameter via a shank outer chamfer and is thus set apart from the shank external diameter. The shank internal diameter merges with this annular surface via a relatively small radius.

Although the P rivet has better properties than the C rivet in the punch riveting of high-strength materials, there is nevertheless still a need for improvement even over the P rivet in this regard.

BRIEF SUMMARY

Accordingly, an object of the present invention is to disclose an improved punch rivet and also an improved method for producing a punch rivet connection allowing high-strength workpieces to be joined in a procedurally safe manner.

The foregoing object is achieved, firstly, by a punch rivet of the type mentioned at the outset, the ratio of the cutting edge radius to the shank external diameter being greater than 0.3.

Furthermore, the foregoing object is achieved by a method for producing a punch rivet connection of at least two workpieces, of which one is made, in particular, of a high-strength material having a strength of at least 800 MPa and has, in particular, a thickness of at least 0.5 mm, including the following steps:

providing a punch rivet which has a head and a shank and is made of a material having a specific rivet hardness, the shank being embodied as a hollow shank having a shank internal diameter, a shank external diameter and a shank end face, and the shank having in the axial projection an annular surface defined by the shank external diameter and the shank internal diameter, in particular a punch rivet of the abovementioned type, and carrying out the punching process, the upper workpiece being punched through with a specific piercing force, wherein the punch rivet is provided with a size of the annular surface that is dependent on the piercing force.

Finally, the foregoing object is achieved by a workpiece arrangement made up of at least two workpieces which are connected by means of at least one punch rivet according to the invention or by means of a punch riveting method according to the invention.

The punch rivet according to the invention has an annular cutting edge, the diameter of which is smaller than the shank external diameter. This can prevent excessively intensive spreading of the punch rivet such as occurs in the case of the C rivet. Furthermore, the ratio of the cutting edge radius to the shank external diameter is greater than 0.3. In other words, the punch rivet has a relatively large cutting edge radius. This allows a slug punched out of the upper, swage-side workpiece to be received during the punching process, at least for the most part, in the hollow shank. In other words, this slug is not, as is the case of the P rivet, pressed downward in the punching direction by the shank end face. This, in turn, also allows joining connections to be achieved in which the lower, die plate-side workpiece is relatively thin.

The method according to the invention can be used for high-strength materials having a strength of at least 800 MPa, and therefore in workpieces made of steel but also in less strong materials such as light metals. The connecting of two workpieces made of aluminium is also possible. The workpieces have preferably a thickness of from 0.8 mm to 2.5 mm. In the case of especially high-strength materials having a strength of 1,000 MPa or even 1,500 MPa or more, the workpieces used are preferably relatively thin, for example 0.8 mm.

The object is thus achieved in full.

It is particularly advantageous, in the case of the punch rivet according to the invention, if the ratio of the cutting edge radius to the shank external diameter is greater than 0.5.

This measure allows the above-described advantages to be attained to an even greater extent.

Furthermore, it is advantageous if the ratio of the cutting edge radius to the shank external diameter is less than 0.7. This prevents the shank from becoming too thin in the region of the end face. Thus, a high punching effect can be achieved even in the case of high-strength steels.

According to a further preferred embodiment, the annular cutting edge merges with the shank external diameter via a shank outer chamfer which is oriented at a chamfer angle of less than 42° in relation to a radial plane. Preferably, the chamfer angle is less than 35°, in particular less than 32°.

This allows the punch rivet to spread more effectively once the swage-side workpiece has been punched through, thus allowing a sufficient undercut and therefore high strength of the punch connection to be attained.

In this case, it is especially advantageous if the shank outer chamfer merges with the shank external diameter via a transition radius. The transition radius may be a very small radius of, for example, less than 0.2 mm, in particular less than 0.15 mm. The transition radius prevents stresses in this region during the punching process.

According to a further preferred embodiment which constitutes its own invention even independently of the ratio of the cutting edge radius to the shank external diameter, the ratio of a head external diameter to the shank external diameter is less than 1.44, in particular less than 1.42.

As a result of this measure, the punch rivet is provided with a relatively large shank external diameter. This allows the annular surface area which the shank has in the axial projection to be increased. The stability of the punch rivet during the punching process can be increased as a result.

Furthermore, it is advantageous if the shank external diameter merges with the outer circumference of the head via an underhead radius, the ratio of the underhead radius to the shank external diameter being greater than 0.15.

Furthermore, it is preferred if the ratio of the underhead radius to the shank external diameter is less than 0.3.

Accordingly, the underhead radius is much smaller than in the case of the C rivet, so that the setting force is reduced. Compared to the P rivet, stresses are accommodated more effectively.

Furthermore, overall it is preferred if the annular cutting edge has a cutting edge annular surface which is oriented in the radial direction and the radial width of which is selected in such a way that the ratio of the annular surface width to the radial thickness of the shank is in the range of from 0.03 to 0.1.

The annular surface width is therefore generally smaller compared to the P rivet, thus allowing collapsing or compressing of the shank to be prevented more effectively during a punching process.

In the punch riveting method according to the invention, it is preferred if the ratio of the piercing force, measured in kN, to the size of the annular surface, measured in $mm^2$, is in the range of from 1.2 to 1.5.

This measure allows the annular surface to be adapted to the required piercing force. As it is preferred to leave the shank external diameter unaltered for various piercing forces, it is preferred if in this case the shank internal diameter is adapted as a function of the required piercing force.

According to a further preferred embodiment, in the punch riveting method according to the invention, the size of the annular surface is determined by the ratio of the piercing force to a modified rivet hardness, the modified rivet hardness being determined by multiplying the rivet hardness by a modification factor which is in the range of from 0.7 to 0.9.

In this way, the annular surface can be set for a defined piercing force and a defined rivet hardness. This is carried out again, as above, preferably by setting the shank internal diameter while the shank external diameter remains unaltered.

It will be understood that the features mentioned hereinbefore and those still to be commented on hereinafter may be used not only in the combination specified in each case, but also in other combinations or in isolation, without departing from the scope of the present invention.

BRIEF DESCRIPTION OF THE SEVERAL VIEWS OF THE DRAWINGS

Exemplary embodiments of the invention are illustrated in the drawings and will be commented on in greater detail in the following description. In the drawings.

DETAILED DESCRIPTION OF THE PREFERRED EMBODIMENTS

Figure 1:
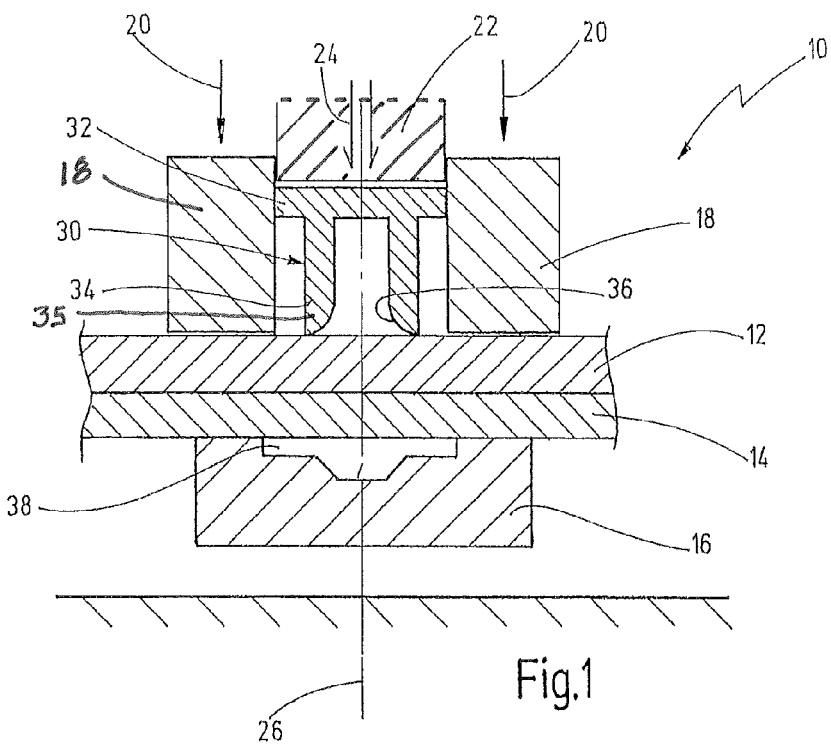
FIG. 1 is a schematic view of a punch riveting device.

In FIG. 1 a punch riveting device is denoted generally by reference numeral 10.

The punch riveting device 10 serves to join together a first workpiece 12 and a second workpiece 14. The workpieces 12, 14 may be, in particular, metal sheets such as are used in vehicle body construction. The thickness of the workpieces 12, 14 may be in the range of from, for example, 0.5 mm to 4 mm, in particular in the range of from 1 mm to 2.5 mm. The materials of the workpieces 12, 14 must meet the conventional requirements placed on cold-formable materials. In many cases, these are alloyed metals such as steel, aluminium, magnesium. It is however also possible to make one of the workpieces 12, 14, in particular the upper workpiece 12, from a plastics material.

The punch riveting device 10 has a first die plate 16 onto which the workpieces 12, 14 are placed one directly above the other. Holding-down means, for example clamps 18, which are pressed onto the workpiece arrangement with a specific holding-down force 20, serve to fix the workpieces. A swage 22, which can be moved toward the die plate 16 along a longitudinal axis 26 with a predetermined punch riveting force 24, is arranged between the clamps 18. The swage 22 serves to drive a punch rivet 30 into the workpiece arrangement 12, 14. The punch rivet 30 is embodied as a self-piercing rivet (SPR) of the semitubular punch rivet type with a head 32 and a hollow shank 34 which extends therefrom in the axial direction and at the end-face end of which a cutting edge 36 is formed.

As the swage 22 moves down, the shank 34 punches first through the upper, swage-side workpiece 12, so that what is known as a slug 64 is cut out therefrom. In the subsequent course of the punching process, the free end 35 of shank 34 is driven into the die plate-side workpiece 14. Formed in the die plate 16 is a hollow space 38 which ensures that the shank 34 is spread radially in the subsequent course of the punch riveting process, so that the free end 35 of the shank 34 urges, viewed in the axial direction behind material of the die plate-side workpiece 14. The punch rivet 30 is generally driven into the workpiece arrangement 12, 14 sufficiently far until the head is flush with the surface of the swage-side workpiece 12.

Different types of punch rivets 30 are generally available for connecting workpieces made of a broad range of materials.

Figure 2:
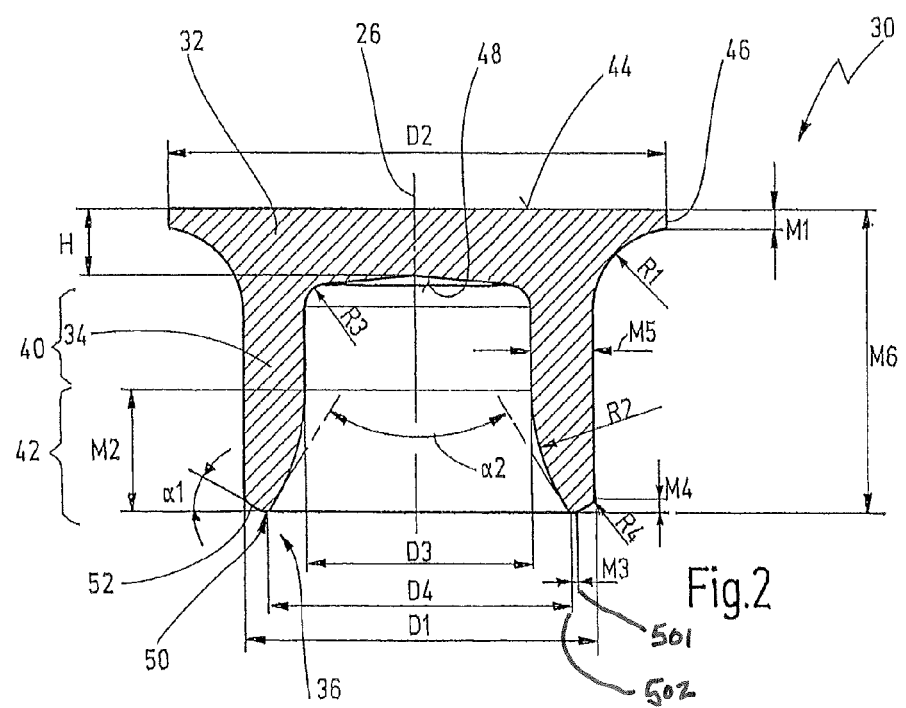
FIG. 2 is a longitudinal sectional view through an embodiment of a punch rivet according to the invention.

FIG. 2 shows an embodiment according to the invention of a punch rivet 30 which is suitable, in particular, in conjunction with workpieces 12, 14 made of high-strength materials. The die plate-side workpiece 14 can have in this case, for example, a strength of greater than 400 MPa, although preferably not more than 800 MPa. The swage-side workpiece may comprise high-strength materials having strengths of more than 1,000 MPa or more than 1,200 MPa.

The punch rivet 30 itself is also made of a high-strength material, for example having a rivet hardness of greater than 1,500 MPa, in particular greater than 1,700 MPa.

The punch rivet 30 is formed rotationally symmetrically about the longitudinal axis 26 and has a head 32 and a shank 34. The shank 34 is divided into a shank portion 40, which adjoins the head 32, and a cutting edge portion 42. The shank portion 40 is embodied in a hollow cylindrical manner and has a shank external diameter D1 and also a shank internal diameter D3. The cutting edge portion 42 has a cutting edge portion height M2.

The head 32 has a planar head upper side 44 and a cylindrical head outer surface 46. The head upper side 44 has a head external diameter D2. The head outer surface 46 has a head outer surface height M1. Within the shank 34, the head 32 has a head underside 48 which in the present case is embodied so as to taper in a bluntly conical manner and merges with the shank internal diameter D3 via a head inner radius R3. At the outer circumference, the shank external diameter D1 merges with the underside of the head outer surface 46 via an underhead radius R1. In this case, the underhead radius R1 is arranged in such a way that it merges tangentially both with the shank external diameter D1 and with a radial plane arranged substantially parallel to the head upper side 44. The head 32 has a head height H extending from the head upper side 44 up to the cone apex of the head underside 48.

The shank 30 has in the region of the shank portion 40 a shank thickness M5 which is equal to half the difference between the shank external diameter D1 and the shank internal diameter D3. Furthermore, in the axial projection the shank 34 has an annular surface, the outer circumference of which is delimited by the shank external diameter D1 and the inner circumference of which is delimited by the shank internal diameter D3.

An annular cutting edge 50, which is embodied as a planar cutting edge annular surface and extends in the radial direction, is formed at the end face of the shank 32, more precisely of the cutting edge portion 42. The internal diameter of the cutting edge annular surface is shown in FIG. 2 at D4. Furthermore, the cutting edge annular surface has a radial width M3. In the axial projection, the annular cutting edge 50 is accordingly positioned somewhat outside the mean shank diameter which is formed by the mean value between the shank external diameter D1 and shank internal diameter D3.

The outer circumference 501 of the cutting edge annular surface 50 merges with the shank external diameter D1 via a shank outer chamfer 52. The shank outer chamfer 52 defines with a radial plane an angle $\alpha_1$. Furthermore, the shank outer chamfer 52 merges with the shank external diameter D1 via a transition radius R4. The outer chamfer height is shown in FIG. 2 at M4.

The inner circumference 502 of the cutting edge annular surface merges with the shank internal diameter D3 via a cutting edge radius R2. In this case, the cutting edge radius R2 merges tangentially with the shank internal diameter D3 and ends while forming an opening angle $\alpha_2$ in the cutting edge annular surface. More precisely, the radius R2 extends from the shank internal diameter D3 toward the cutting edge annular surface in such a way that the inside of the shank produces an opening angle $\alpha_2$ of 65°. The opening angle $\alpha_2$ should preferably be greater than 55°.

The abovementioned dimensions of the punch rivet 30 are represented in the following Table 1. For the respective values there are specified, on the one hand, preferred value ranges and furthermore an example of an especially preferred embodiment, such as is shown in FIG. 2. In addition, Table 1 specifies preferred ratios of these dimensions revealing how a punch rivet according to the invention can also be designed for other examples of application.

TABLE 1

|  | Designation | Value range | Example | Ratios |
| --- | --- | --- | --- | --- |
| Shank external diameter | D1 | ≥5.3 mm | 5.50 mm |  |
| Head external diameter | D2 | ≤8.0 mm | 7.75 mm | D2/D1 < 1.44 |

TABLE 1-continued

| Designation | | Value range | Example | Ratios |
|---|---|---|---|---|
| Shank internal diameter | D3 | ≤3.5 mm | 3.35 mm | D3/D1 < 0.7 |
| Annular cutting edge diameter | D4 | | 4.60 mm | D4 > (D1 − D3)/2 |
| Head outer surface height | M1 | ≤0.50 mm | 0.30 mm | |
| Cutting edge portion height | M2 | ≥1.4 mm | 1.80 mm | M2/D1 > 0.25 |
| Cutting edge annular surface width | M3 | >0 AND ≤0.15 mm | 0.10 mm | 0.03 < M3/M5 < 0.1 |
| Outer chamfer height | M4 | ≤0.4 mm | 0.30 mm | M4/D1 < 0.07 |
| Shank thickness | M5 | ≥1 mm | 1.075 mm | |
| Rivet length | M6 | Variable | 4.5 mm | |
| Chamfer angle | $\alpha_1$ | ≤42° | 30° ± 10° | |
| Opening angle | $\alpha_2$ | ≤55° | 65° | |
| Head height | H | ≤1.5 mm | 1.00 mm | |
| Underhead radius | R1 | ≤1.5 mm | 1.20 mm | 0.15 < R1/D1 < 0.3 |
| Cutting edge radius | R2 | ≥2 mm | 3.00 mm | 0.3 < R2/D1 < 0.7 |
| Head inner radius | R3 | | 0.50 mm | |
| Transition radius | R4 | | 0.10 mm | |

Furthermore, it will be understood that the punch rivet 30 may be embodied in different lengths, the length of the shank portion 40 varying in this regard in each case. The cutting edge portion 42 remains, on the other hand, preferably unaltered in all the embodiments at different lengths.

FIG. 2 shows the axial total length of the punch rivet 30 at M6.

As a result of the ratio of D2/D1<1.44, the punch rivet 30 can be embodied with a relatively large shank external diameter D1, as a result of which the stability increases during the punch riveting process. As a result of the ratio of D3/D1<0.7, the shank 34 can be embodied with a relatively large (thick walled) annular surface in the axial projection.

As a result of the ratio of D4>(D1−D3)/2, it is possible to ensure that the shank 34 tends to splay more radially outward during a punching process and accordingly assists the cold forming for the purpose of undercutting the die plate-side workpiece 14.

The ratio of M2/D1>0.25, in particular >0.3, allows a relatively large volume to be received in the interior of the shank 34 during the punching process. Accordingly, it is possible for the shank 34 to at least substantially receive a slug 64 separated off from the swage-side workpiece 12. This prevents the slug 64 from being pressed axially down by the shank 34; this would lead either to compressing of the punch rivet 30 or to breakage of the die plate-side workpiece 14.

As a result of the Table 1 ratio for the cutting edge annular surface width M3 to the shank thickness M5 (0.03<M3/M5<0.1), it is possible to ensure that a good punching effect can be achieved at high stability. This also applies to the ratio of the outer chamfer height to the shank external diameter (M4/D1<0.07).

The ratio of R2/D1>0.3 also produces, like the relatively high cutting edge portion height M2, a relatively large volume in the interior of the shank 34, so that the punched-out slug 64 can be accommodated. This can prevent the shank 34 from becoming compressed during the punch riveting of high-strength materials.

Figure 3:
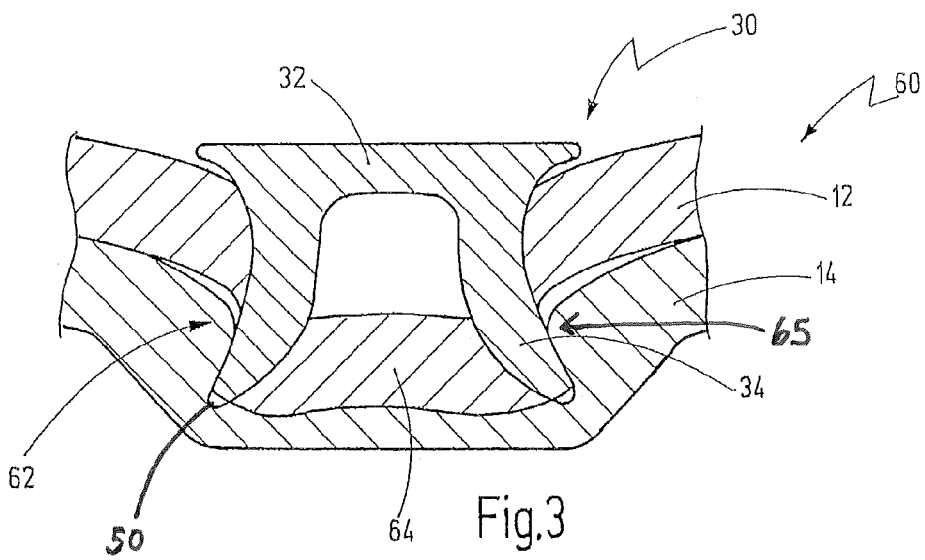
FIG. 3 shows a punch rivet connection produced by means of the punch rivet shown in FIG. 2.

FIG. 3 shows a workpiece arrangement 60 which is produced by means of the punch rivet 30 shown in FIG. 2 and contains a punch rivet connection 62. The punch rivet connection 62 connects an upper, swage-side workpiece 12 to a lower, die plate-side workpiece 14 by means of a reshaped punch rivet 30. The swage-side workpiece 12 was in this case a steel having a thickness of 2 mm of the DP 800 type. The die plate-side workpiece 14 was an aluminium metal sheet having a thickness of 2 mm.

It may be seen that the punch rivet 30 has received the slug 64, which is punched out of the swage-side workpiece 12, almost completely within the shank 34. At the same time, the shank 34 has spread sufficiently to form an undercut 65 with material of the die plate-side workpiece 14 in such a way that sufficient material of the die plate-side workpiece 14 is present within the undercut 65 between the head 32 and the cutting edge 50. The head upper side 44 of the punch rivet 30 is substantially flush with the original upper side of the swage-side workpiece 12.

Figure 4:
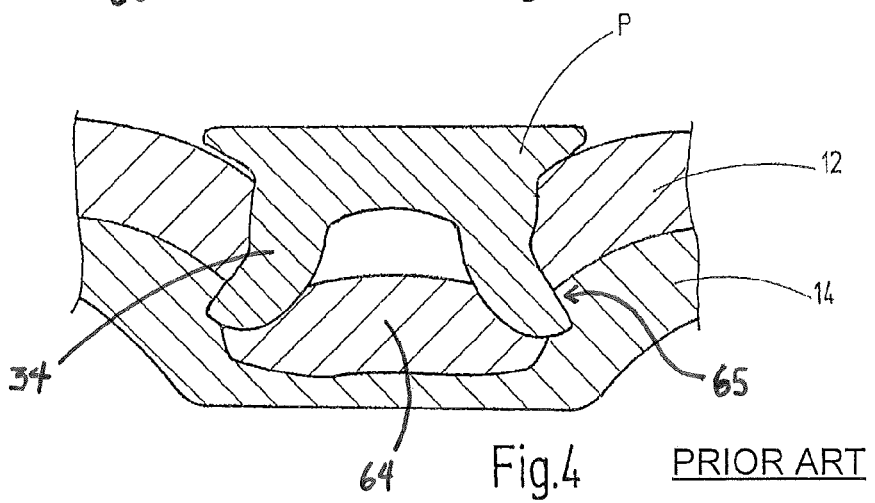
FIG. 4 shows a punch rivet connection produced in accordance with the prior art using what is known as a P punch rivet.

FIG. 4 shows a comparative test of the same workpieces 12, 14 connected using a P rivet such as is known, for example, from DE 10 2005 052 360 B4. It may be seen that the punch rivet P has collapsed in the axial direction. In this case, the shank 34 has driven the slug 64 in front of it and has not managed to form a sufficient undercut 65 in the die plate-side workpiece 14.

Figure 5:
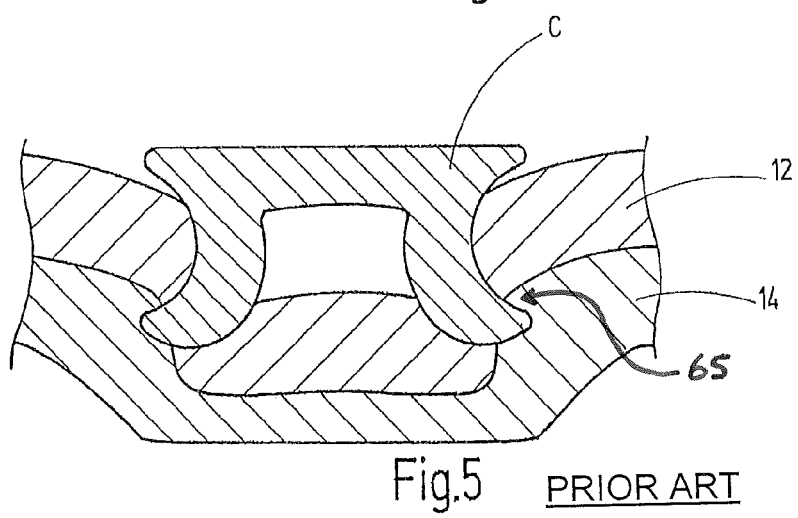
FIG. 5 shows a punch rivet connection produced in accordance with the prior art using what is known as a C punch rivet.

FIG. 5 shows a C rivet such as is basically known from document WO 95/09307. It may be seen here that, during the punching of the same material, the rivet C is spread very intensively and cannot form a sufficient undercut 65.

Figure 6:
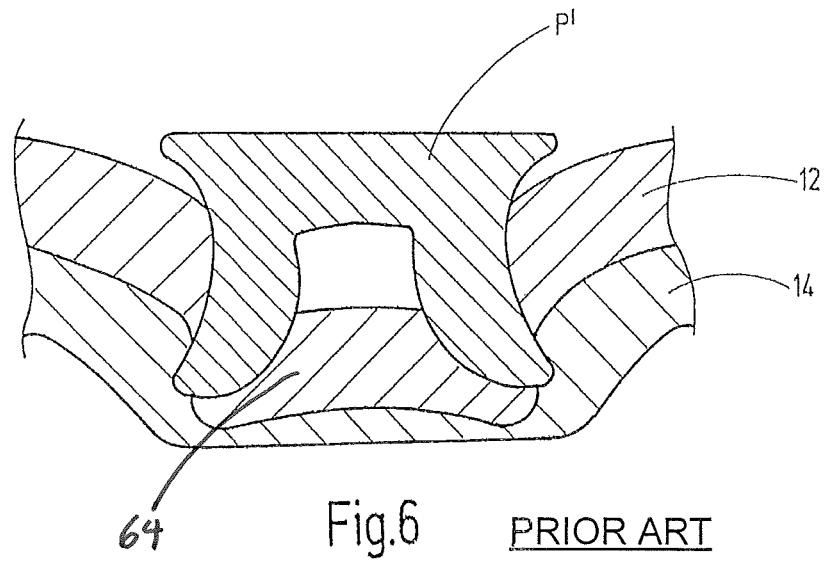
FIG. 6 shows a punch rivet connection, produced in accordance with the prior art using a modified P punch rivet, to a relatively thin, die plate-side workpiece.

Finally, FIG. 6 shows a further comparative example, wherein the die plate-side workpiece 14 was somewhat thinner (1.7 mm aluminium instead of 2.0 mm in the preceding tests). A punch rivet P' was used such as is basically known from document US 2009/0116934 A1. It may be seen that the slug 64 has in this case been pressed downward very intensively by the punch rivet and the punch rivet P' has been compressed very intensively.

Figure 7:
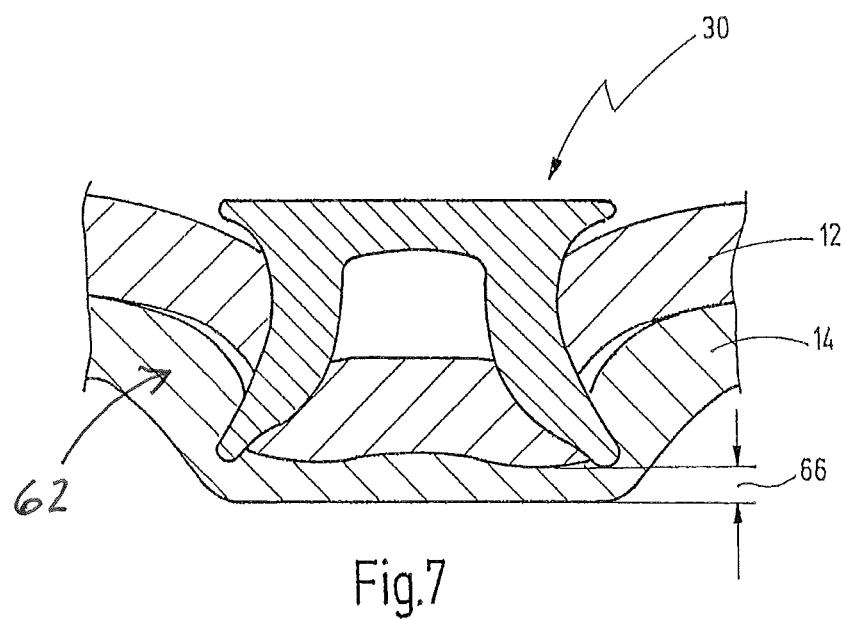
FIG. 7 shows a punch rivet connection, produced by means of the punch rivet shown in FIG. 2, to a relatively thin, die plate-side workpiece.

FIG. 7 shows a punch rivet connection 62 with the same workpieces 12, 14 as in FIG. 6, but produced using a punch rivet 30 according to the invention. It may be seen that a much greater residual thickness 66 remains in the die plate-side workpiece 14 compared to the punch rivet connection of FIG. 6 when the punch rivet 30 according to the invention is used. The advantages which were described above in detail with reference to FIG. 3 are additionally achieved.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A punch rivet for connecting two workpieces, the rivet comprising a head and a hollow shank open at a first end, the shank defining a shank internal diameter (D3), a shank external diameter (D1) and including at the first end an annular cutting edge defining a cutting edge diameter (D4) smaller than the shank external diameter (D1), and the shank internal diameter (D3) merges with the annular cutting edge via a cutting edge radius (R2), and the ratio of the cutting edge radius (R2) to the shank external diameter (D1) is greater than 0.5 and less than 0.7; and the annular cutting edge merges with the shank external diameter (D1) via a shank outer chamfer which is oriented at a chamfer angle ($\alpha_1$) of less than 42° in relation to a radial plane.

2. A punch rivet according to claim 1, wherein the shank outer chamfer merges with the shank external diameter (D1) via a transition radius (R4).

3. A punch rivet according to claim 1, wherein the head defines a head external diameter (D2) and the ratio of the head external diameter (D2) to the shank external diameter (D1) is less than 1.44.

4. A punch rivet according to claim 1, wherein the shank external diameter (D1) merges with an outer circumference of the head via an underhead radius (R1), and the ratio of the underhead radius (R1) to the shank external diameter (D1) is greater than 0.15.

5. A punch rivet according to claim 1, wherein the shank external diameter (D1) merges with an outer circumference of the head via an underhead radius (R1), and the ratio of the underhead radius (R1) to the shank external diameter (D1) is less than 0.3.

6. A punch rivet according to claim 1, wherein the hollow shank defines a radial shank thickness (M5) and the annular cutting edge includes a cutting edge annular surface defining a radial cutting edge width (M3), and the ratio of cutting edge width (M3) to the radial shank thickness (M5) is in the range of from 0.03 to 0.1.

7. A punch rivet according to claim 1, wherein the shank includes a cutting edge portion defining a cutting edge portion height (M2), and the ratio of the height (M2) to the shank external diameter (D1) is greater than 0.25.

8. A punch rivet according to claim 1, wherein the chamfer angle ($\alpha_1$) is less than 35°.

9. A punch rivet according to claim 1, wherein an acute opening angle $\alpha 2$ is defined between a first line tangent to the cutting edge radius R2 at the annular cutting edge and a second line tangent reflected across a longitudinal axis of the rivet, and the opening angle $\alpha 2$ is greater than 55°.

10. A method for producing a punch rivet connection of a first workpiece to a second workpiece with a rivet, and the first workpiece is made of a high-strength material having a strength of at least 800 MPa and has a thickness of at least 0.5 mm, the method comprising the steps of:
    selecting a specific piercing force to drive the punch rivet into the first workpiece and second workpiece;
    providing a punch rivet comprising a head and a hollow shank open at a first end, the shank defining a shank internal diameter (D3), a shank external diameter (D1) and including at the first end an annular cutting edge defining a cutting edge diameter (D4) smaller than the shank external diameter (D1), and the shank internal diameter (D3) merges with the annular cutting edge via a cutting edge radius (R2), and the ratio of the cutting edge radius (R2) to the shank external diameter (D1) is greater than 0.5 and less than 0.7; and the annular cutting edge merges with the shank external diameter (D1) via a shank outer chamfer which is oriented at a chamfer angle ($\alpha_1$) of less than 42° in relation to a radial plane, and an axial projection of the shank defines an annular surface between the shank external diameter (D1) and the shank internal diameter (D3), and the size of the annular surface for the rivet provided is dependent on the selected piercing force; and
    carrying out the punching process, including driving the shank of the punch rivet through the upper workpiece, such that the ratio of the piercing force, measured in kN, to the size of the annular surface, measured in mm$^2$, is in the range of from 1.2 to 1.5.

11. A method according to claim 10, wherein the size of the annular surface is determined by the ratio of the piercing force to a modified rivet hardness, and the modified rivet hardness is calculated by a modification factor in the range from 0.7 to 0.9.

* * * * *